US008280367B2

(12) United States Patent
Wilson et al.

(10) Patent No.: US 8,280,367 B2
(45) Date of Patent: *Oct. 2, 2012

(54) METHODS AND APPARATUS FOR EFFICIENTLY MANAGING THE STORAGE OF E-MAIL MESSAGE INFORMATION FOR A MOBILE STATION

(75) Inventors: Sean Elliot Wilson, Kitchener (CA); Anthony Fabian Scian, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,136

(22) Filed: Dec. 27, 2010

(65) Prior Publication Data
US 2011/0093795 A1    Apr. 21, 2011

Related U.S. Application Data

(63) Continuation of application No. 11/683,705, filed on Mar. 8, 2007, now Pat. No. 7,885,649, which is a continuation of application No. 10/997,178, filed on Nov. 24, 2004, now Pat. No. 7,212,814.

(51) Int. Cl.
*H04W 4/00* (2009.01)

(52) U.S. Cl. .................................. 455/422.1

(58) Field of Classification Search ........................ None
See application file for complete search history.

(56) References Cited

U.S. PATENT DOCUMENTS

| | | | |
|---|---|---|---|
| 7,212,814 B2 | 5/2007 | Wilson et al. | |
| 7,885,649 B2 * | 2/2011 | Wilson et al. ............ | 455/422.1 |
| 2004/0172453 A1 | 9/2004 | De Mendonca et al. | |

FOREIGN PATENT DOCUMENTS

| | | |
|---|---|---|
| EP | 1071029 A2 | 1/2001 |
| WO | 9943171 A1 | 8/1999 |
| WO | 2004072872 A1 | 8/2004 |

OTHER PUBLICATIONS

European Search Report & Written Opinion for EP Application# 04257308.9, May 20, 2005.
"Blackberry Wireless Handheld User Guide", Research In Motion Limited, Canada, 2003.

* cited by examiner

*Primary Examiner* — Thang Tran
*Assistant Examiner* — Huy D Nguyen
(74) *Attorney, Agent, or Firm* — John J. Oskorep, Esq.

(57) ABSTRACT

A mobile device receives, via a wireless network, a plurality of messages and stores message information of the messages in memory. Each message includes at least one correspondent address and conversation text with the at least one correspondent address, as well as metadata comprising an identifier for uniquely identifying the message at a server. The mobile device identifies whether a size of the message information has reached a first predetermined limit of the memory. Based on identifying that the size of the message information has reached the first predetermined limit, the mobile device deletes from the memory, automatically without user intervention, at least portions of the conversation text of some of the messages while retaining storage of the correspondent addresses and the metadata thereof. The mobile device also identifies whether the size of the message information has reached a second predetermined limit of the memory, which is greater than the first predetermined limit. Based on identifying that the size of the message information has reached the second predetermined limit, the mobile device deletes from the memory, automatically without user intervention, the correspondent addresses and the metadata associated with the messages having the deleted conversation texts.

20 Claims, 8 Drawing Sheets

FIG. 1
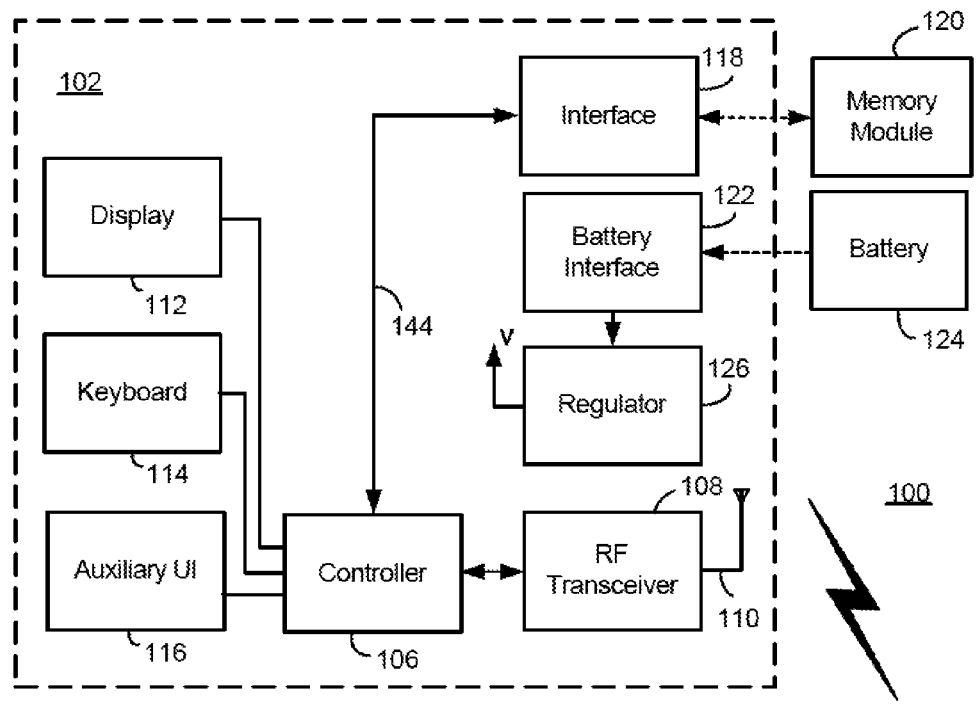
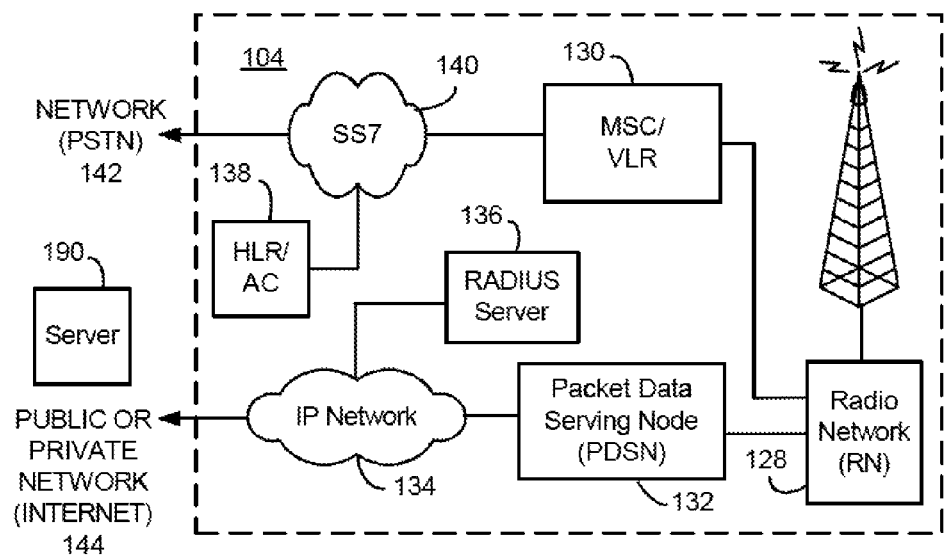

METHODS AND APPARATUS FOR EFFICIENTLY MANAGING THE STORAGE OF E-MAIL MESSAGE INFORMATION FOR A MOBILE STATION

CROSS-REFERENCE TO RELATED APPLICATIONS

The present application is a continuation of and claims priority to U.S. non-provisional patent application having application Ser. No. 11/683,705 and filing date of 8 Mar. 2007, now U.S. Pat. No. 7,885,649, which is a continuation of and claims priority to U.S. non-provisional patent application having application Ser. No. 10/997,178 and filing date of 24 Nov. 2004, now U.S. Pat. No. 7,212,814, each application being hereby incorporated by reference herein.

BACKGROUND

1. Field of the Technology

The present application relates generally to mobile stations operating in a wireless communication network, and more particularly to methods and apparatus for efficiently managing the storage of e-mail message information for mobile stations.

2. Description of the Related Art

A wireless communication device, such as a mobile station operating in a cellular telecommunications network, may provide for both voice telephony and data communications. A mobile station may, for example, be compatible with $3^{rd}$ Generation (3G) communication standards (such as IS-2000 Release 0) and utilize Global System for Mobile Communications (GSM), Time Division Multiple Access (TDMA), or Code Division Multiple Access (CDMA) wireless network technologies.

Such mobile stations may have the ability to send and receive electronic mail (e-mail) messages. These e-mail messages may be seamlessly integrated, synchronized, and updated via the cellular network, with the mobile station user's corresponding e-mail messages being stored and/or associated with a host computer system or server to thereby create a mirrored host computer for the mobile station.

The mobile station itself, however, has a limited amount of memory for the storage of e-mail. Traditional techniques for managing the storage of e-mail message information involve the automatic deletion of some of the "oldest" e-mail messages in the memory once the memory is full or near full. This is inconvenient as there may be a desire to retrieve some of these older messages at some point in time.

Accordingly, what are needed are improved methods and apparatus for efficiently managing the storage of e-mail message information for mobile stations so as to overcome the deficiencies in the prior art.

BRIEF DESCRIPTION OF THE DRAWINGS

Embodiments of present application will now be described by way of example with reference to attached figures, wherein:

FIG. 1 is a block diagram which illustrates pertinent components of a mobile station and a wireless communication network;

DETAILED DESCRIPTION OF THE PREFERRED EMBODIMENTS

Figure 2:
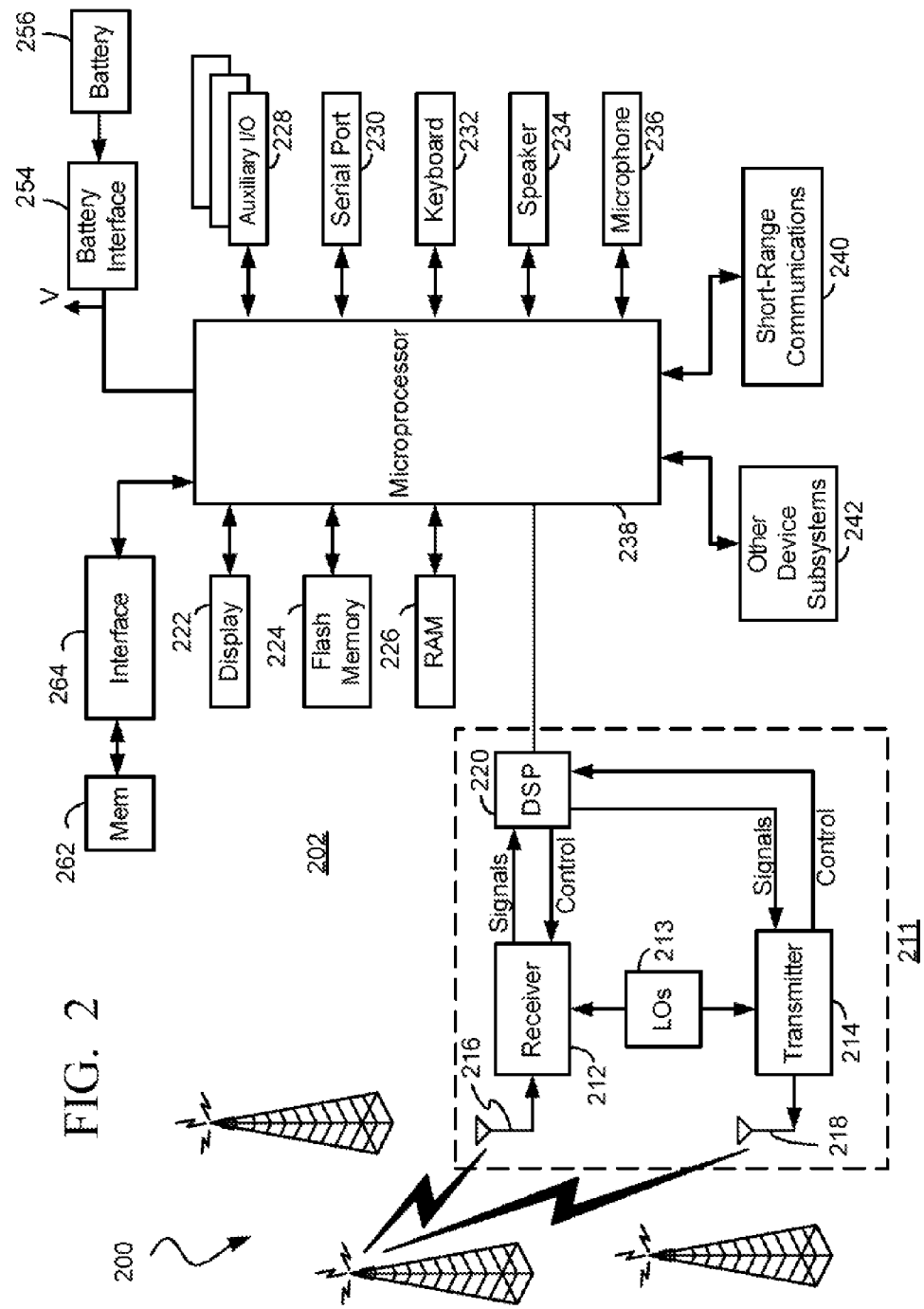
FIG. 2 is a more detailed diagram of a preferred mobile station of FIG. 1.

Methods and apparatus for efficiently managing the storage of e-mail message information for a mobile station are described herein. A plurality of e-mail messages are received by a mobile station through a wireless network and stored in memory. If a size of the e-mail messages reaches a predetermined limit of the memory, e-mail message bodies of some of the e-mail messages are deleted from the memory while e-mail message headers of the e-mail messages are retained. E-mail message headers of e-mail messages having deleted e-mail message bodies may still be visually displayed at the mobile station. If a user selection of one of these e-mail messages is identified, an e-mail message body of the e-mail message is requested by the mobile station and received from a server through the wireless network. Thus, the e-mail message body of the selected e-mail message can still be visually displayed at the mobile station.

FIG. 1 is a block diagram of a communication system 100, which includes a mobile station 102, which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110. Typically, controller 106 is embodied as a central processing unit (CPU), which runs operating system software in a memory component (not shown). Controller 106 will normally control overall operation of mobile station 102, whereas signal-processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device, providing an output having a regulated voltage V. The output from battery interface 122 is further coupled to battery sensing circuitry 190 which helps monitor the condition of battery 124 with controller 106. Mobile station 102 also operates using a memory module 120, such as a Subscriber Identity Module (SIM) or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a cdma2000™ network which includes fixed network components coupled as shown in FIG. 1. Cdma2000™ is a trademark of the Telecommunications Industry Association (TIA). Wireless network 104 of the cdma2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128, which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group .of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. HLR/AC 138 also authenticates mobile station 102 on system access. In order to provide packet data services to mobile station 102 in a cdma2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 utilized in the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown) which regulates power to all of the circuitry, providing an output having a regulated voltage V. The output of the battery interface 254 is coupled to battery sensing circuitry 280 which helps monitor the condition of battery 256 using a microprocessor 238.

Microprocessor 238, which is one implementation of controller 106 of FIG. 1, controls overall operation of mobile station 202. This control includes message deletion techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications, which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. In particular, mobile station 202 has an e-mail application for sending and receiving e-mail messages. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system or server (e.g. see server 190 of FIG. 1) thereby creating a mirrored host computer for mobile station 202 with respect to such items. These data items include received and stored e-mail messages. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component, which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
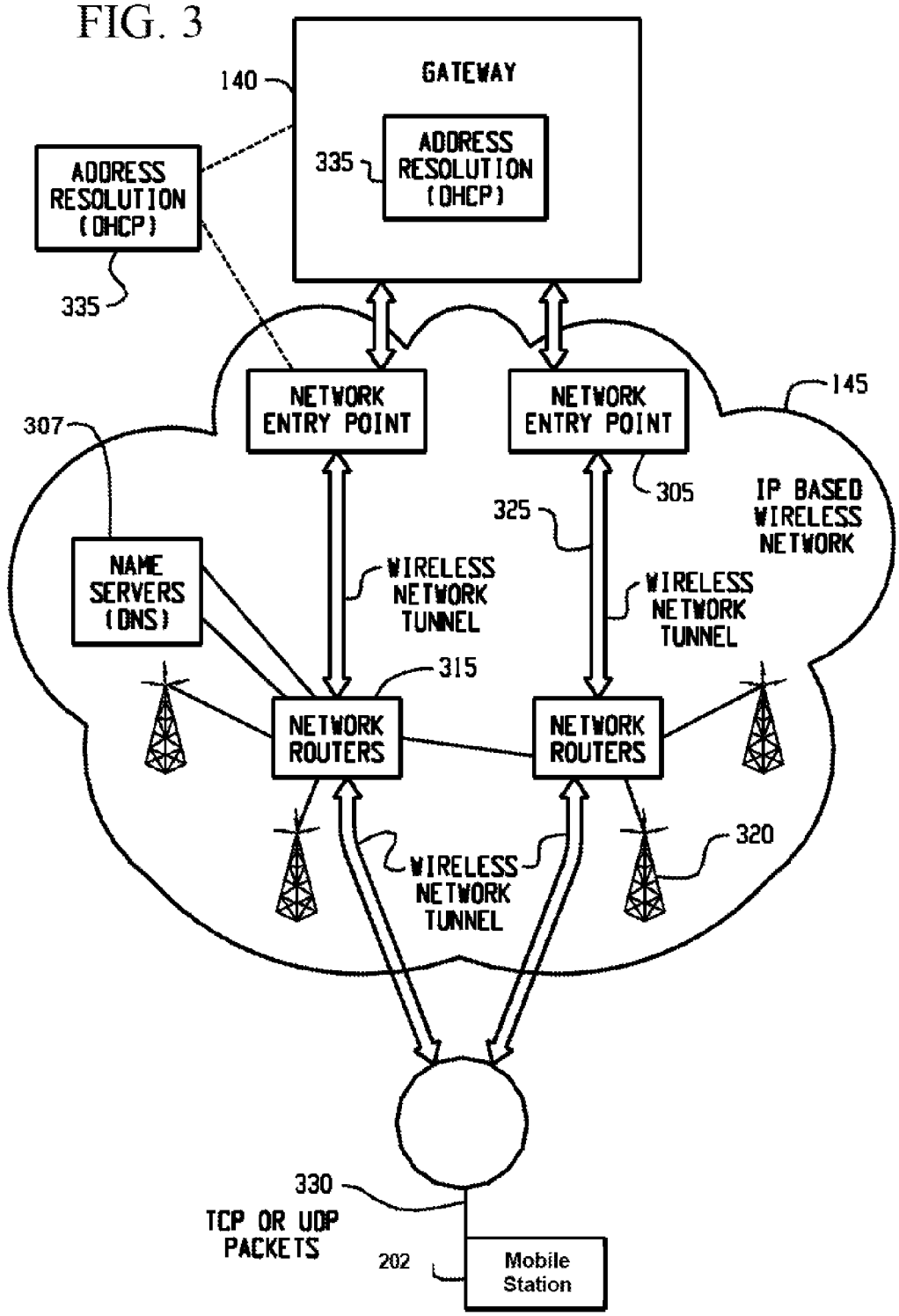
FIG. 3 is an illustration of a preferred system for the mobile station of FIG. 1 or FIG. 2.

FIG. 3 shows a particular system structure for communicating with a mobile station. In particular, FIG. 3 shows basic components of an IP-based wireless data network which may be utilized. A mobile station 100 communicates with a wireless packet data network 145, and may also be capable of communicating with a wireless voice network (not shown). As shown in FIG. 3, a gateway 140 may be coupled to an internal or external address resolution component 335 and one or more network entry points 305. Data packets are transmitted from gateway 140, which is source of information to be transmitted to mobile station 100, through network 145 by setting up a wireless network tunnel 325 from gateway 140 to mobile station 100. In order to create this wireless tunnel 325, a unique network address is associated with mobile station 100. In an IP-based wireless network, however, network addresses are typically not permanently assigned to a particular mobile station 100 but instead are dynamically allocated on an as-needed basis. It is thus preferable for mobile station 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 100.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 100 must use a specific technique associated with wireless network 345. The step of opening such a wireless tunnel 325 may require mobile station 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 100 and communicated to gateway 140, information can then be forwarded from gateway 140 to mobile station 100.

Wireless tunnel 325 typically has a limited life, depending on mobile station's 100 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for mobile station 100 when wireless tunnel 325 was first opened. Once the IP address is lost and wireless tunnel 325 is torn down, gateway 140 loses all ability to initiate IP data packets to mobile station 100, whether over Transmission Control Protocol (TCP) or over User Datagram Protocol (UDP).

As described, mobile station 202 is adapted to receive and send e-mail messages through the wireless network. The e-mail messages are typically received by the mobile station from different sources at different points in time over some period of time. The e-mails messages are initially received at a host server account associated with the user of mobile station 202; this e-mail account is synchronized (at least substantially) in real time with the application at mobile station 202. Copies of the e-mail messages are sent through the wireless network, received by the mobile station via its e-mail application, and stored in memory.

Figure 4:
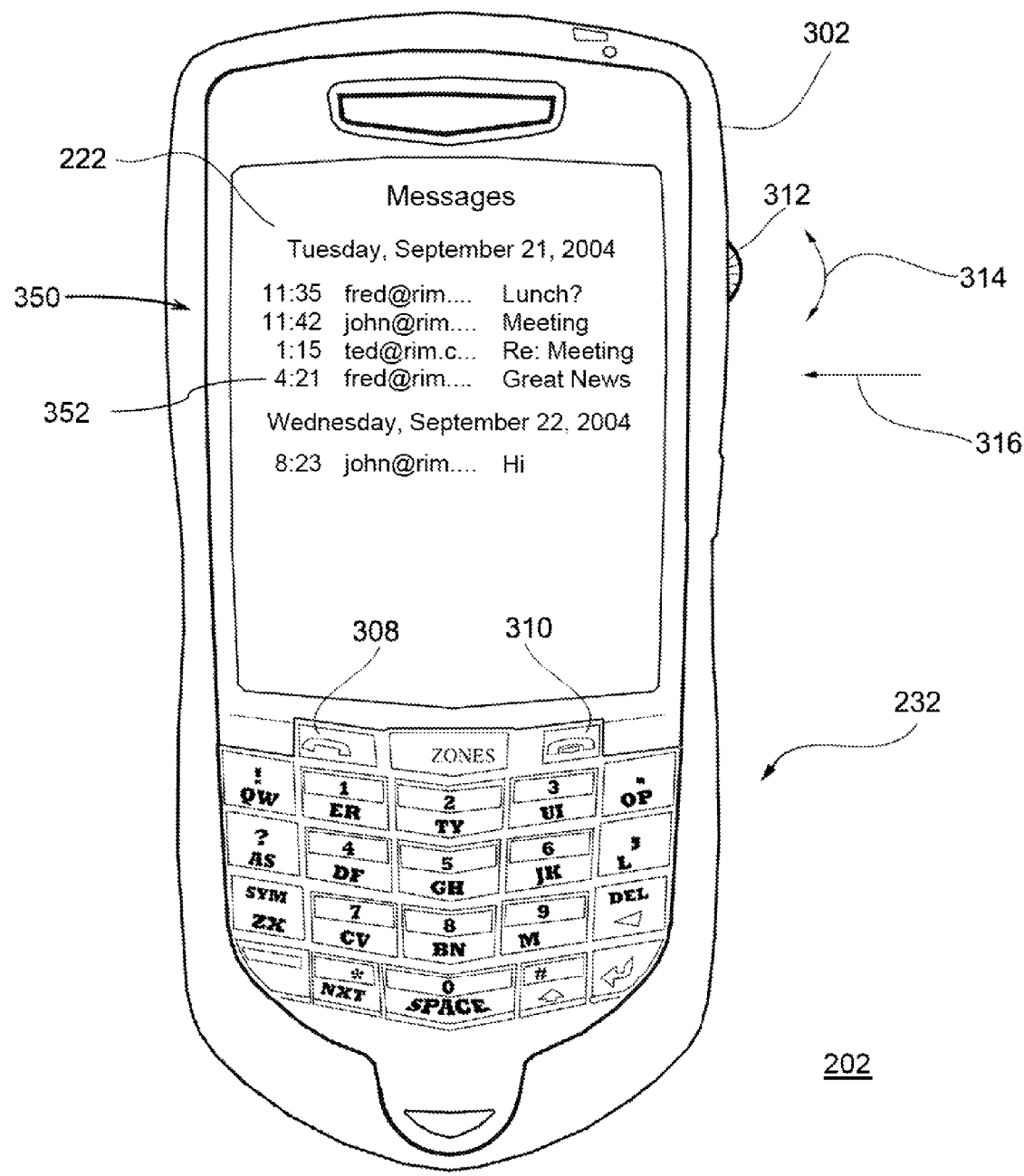
FIG. 4 is an illustration of a user interface of the mobile station which includes a visual display which displays a plurality of electronic mail (e-mail) message headers of e-mail messages stored in memory of the mobile station.
Figure 5:
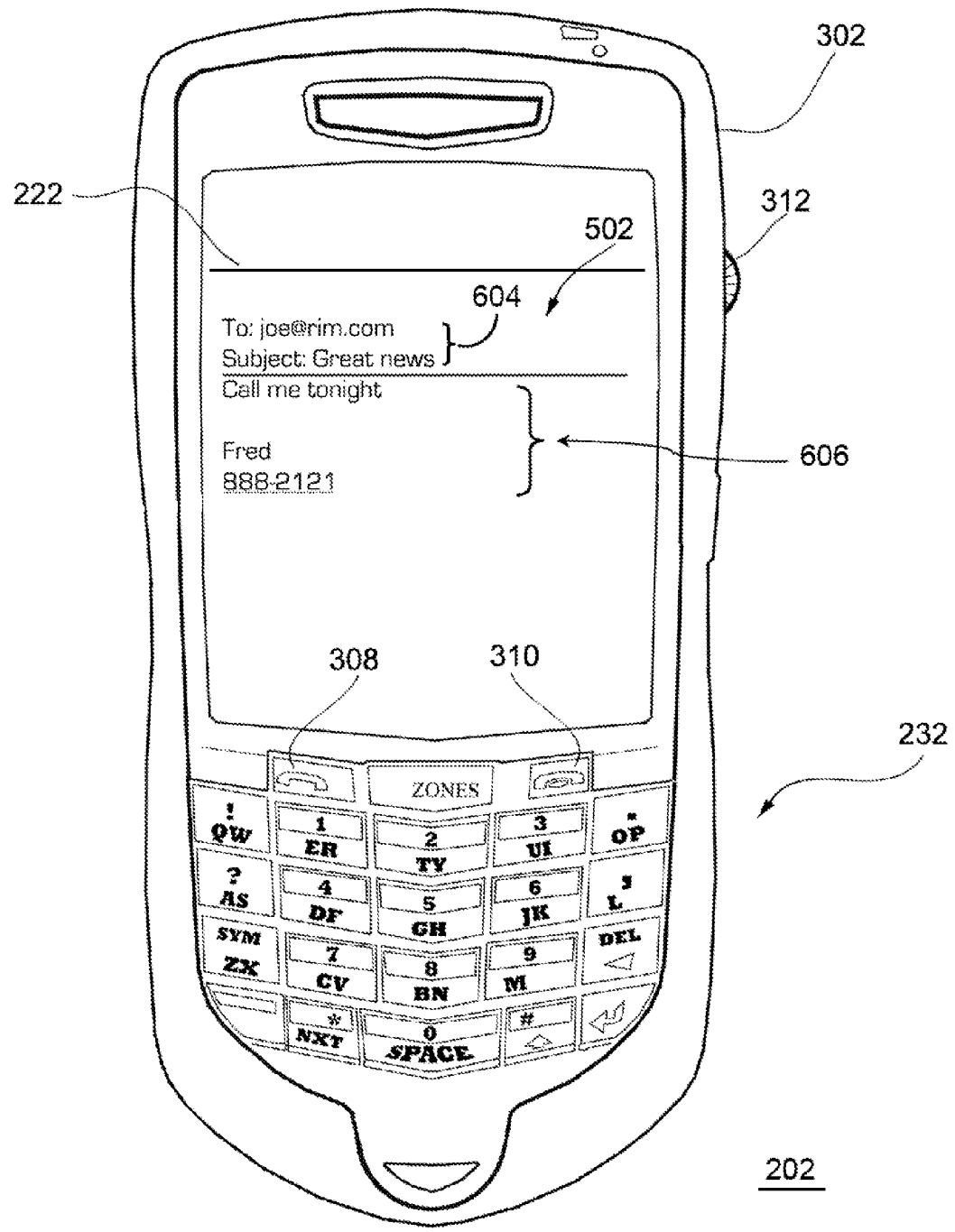
FIG. 5 is an illustration of the user interface of FIG. 4 which includes the visual display which displays an e-mail message body associated with one of the e-mail messages.

FIG. 4 is a visual illustration of a front side of an exemplary mobile station 202 which may be used with the present techniques. Mobile station 202 of FIG. 4 has a housing 302 which contains the electronic circuitry and components shown and described in relation to FIGS. 1-2. Housing 302 of mobile station 202 includes a user interface having visual display 222 and keypad 232 with a plurality of keys as generally earlier shown and described in relation to FIG. 2. As shown, visual display 222 is used to visually display a list of e-mail message headers 350 (FIG. 4). As shown in FIG. 5, visual display 222 is also used to visually display e-mail messages associated with these e-mail message headers (see e.g. an e-mail message 502 of FIG. 5). Typically, e-mail message headers 350 of FIG. 4 which are viewable in the list correspond to all e-mail messages which are received and stored in memory of mobile station 202.

Figure 6:
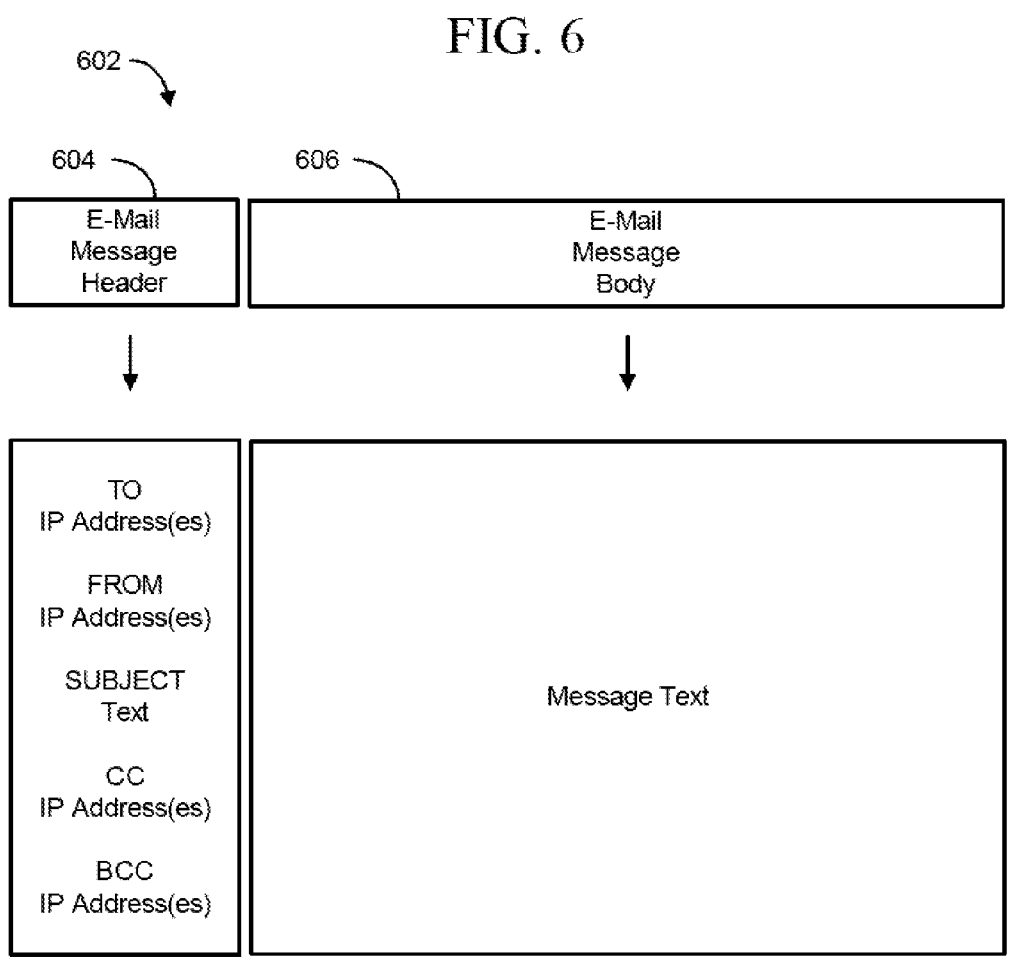
FIG. 6 is an illustration of a general format of an electronic mail (e-mail) message which includes an e-mail message header and an e-mail message body.

In FIG. 6, an illustration of a general format of e-mail message 502 which includes an e-mail message header 604 and an e-mail message body 606 is shown. As illustrated, e-mail message 602 includes specific information in e-mail message header 604 which includes one or more destination IP addresses ("TO"), a source IP address ("FROM"), a subject text line ("SUBJECT"), one or more carbon copy IP addresses ("CC"), and one or more blind carbon copy IP addresses ("BCC"). However, e-mail message header 604 may include any one or more of these items of information. E-mail message 602 also has e-mail message body 606 which typically includes alphanumeric text data, but may include other suitable data such as Hyperlink Transfer Markup Language (HTML) data. E-mail message body 606 may indeed be referred to as the "message" within e-mail message 602. E-mail message body 606 has a variable length and, in many cases, consumes much greater memory space than that of e-mail message header 604. Not shown in FIG. 6 are metadata associated with each e-mail message, described in more detail below.

Referring back to FIG. 4, the plurality of keys of keypad 232 include a plurality of alphanumeric keys as well as control keys. As shown, the alphanumeric keys are associated with telephone digits 0, 1, 2, 3, 4, 5, 6, 7, 8, 9, * and # used for placing telephone calls. In addition, the alphanumeric keys are associated with text letters A-Z and symbols for authoring e-mail messages. The control keys include a SEND key 308 (having a telephone handset icon inscribed thereon) and an END key 310 (having a telephone handset hang-up icon inscribed thereon). SEND key 308 is used by the user for initiating a telephone call from mobile station 202 through the wireless network, and END key 310 is used by the user for terminating the telephone call. Note that the keys may alternatively be visual objects which are displayed in visual display 222 and detectable to the touch if visual display 222 is a touch screen display or other similar input device.

Given the relatively large size of visually displayed information and the compact size of visual display 222, information and messages may be only partially presented in the limited view of visual display 222 at any given moment. Thus, mobile station 202 of FIGS. 4-5 also includes an information viewing/selection mechanism for use with visual display 222. In the present embodiment, the information viewing/selection mechanism of mobile station 202 is a scrollwheel 312. Scrollwheel 312 is positioned on a right hand side of housing 302. Scrollwheel 312 generally includes a circular disc which is rotatable about a fixed axis of housing 302, and may be rotated by the user's index finger or thumb. See the directions indicated by a rotation arrow 314 of scrollwheel 312 shown in FIG. 4. When the information or message is being partially displayed, an upwards rotation of scrollwheel 312 causes an upwards scrolling such that visual display 222 presents viewing of an upper portion of the message list or message. Similarly, a downwards rotation of scrollwheel 312 causes a downwards scrolling such that visual display 222 presents viewing of a lower portion of the message list or message. Note also that scrollwheel 312 is mounted along a fixed linear axis such that the user can depress scrollwheel 312 inwards toward housing 312 (e.g. with the user's index finger or thumb) for selection of information. See the directions indicated by an arrow 316 of scrollwheel 312 shown in FIG. 4. This scrollwheel 312 is particularly utilized to select one of the e-mail message headers (e.g. an e-mail message header 352 of FIG. 4) to visually display an associated e-mail message (e.g. an e-mail message 502 of FIG. 5).

Although scrollwheel 312 of FIGS. 4-5 has been shown and described as the preferred mechanism for use in viewing and selecting visually displayed information (e.g. e-mail messages), any suitable viewing/selection mechanism may be utilized for the present techniques to be described, such as UP and DOWN keys, a mouse and cursor mechanism, or a touch screen display mechanism.

Figure 7:
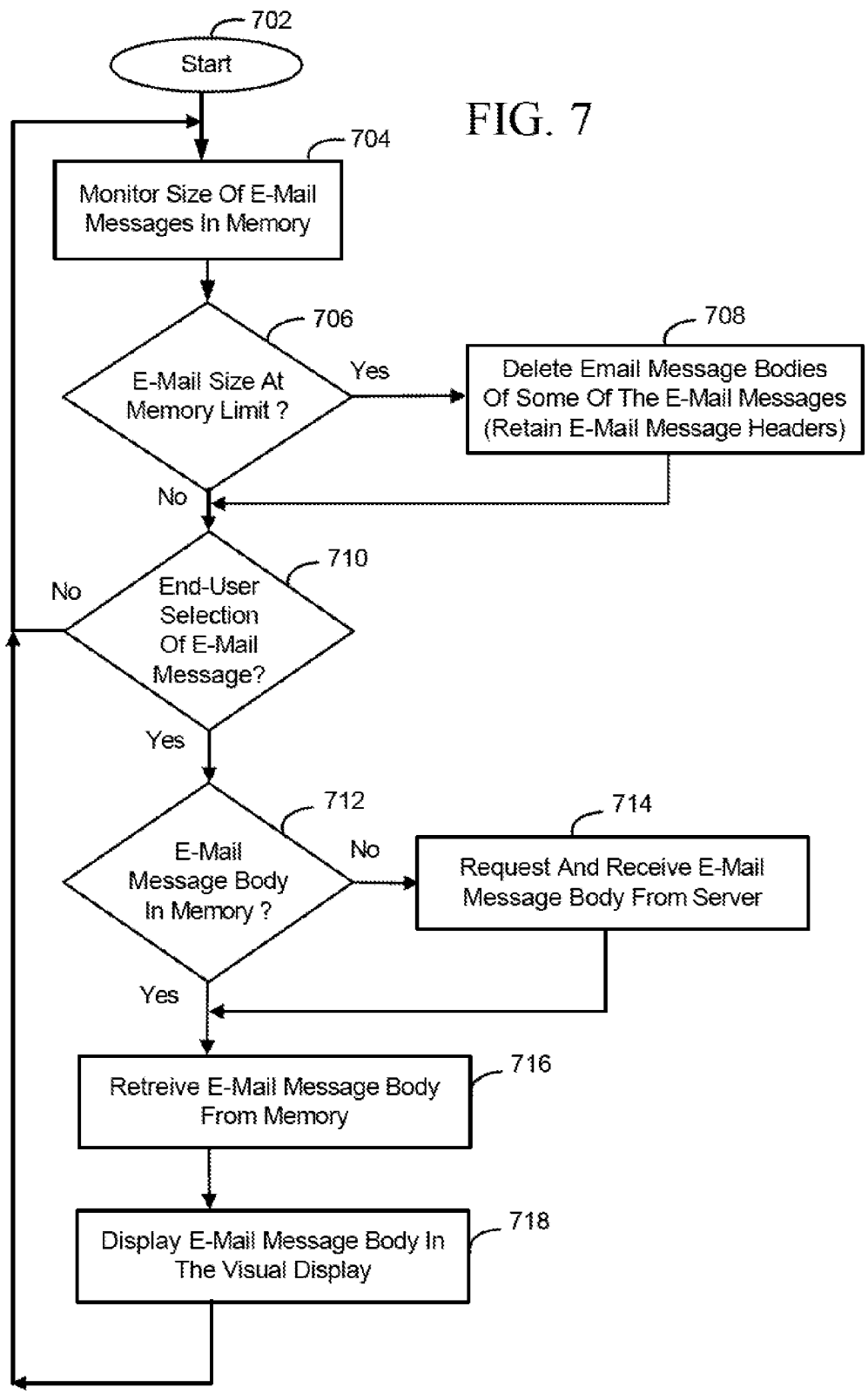
FIG. 7 is a flowchart for describing a method of efficiently managing the storage of e-mail message information for the mobile station.

FIG. 7 is a flowchart for describing a method of efficiently managing the storage of e-mail message information for a mobile station. The method of FIG. 7 is performed by a mobile station operating in a wireless network (e.g. see FIGS. 1-3). As described in relation to FIGS. 1-2, the mobile station may include a wireless transceiver, a user interface which includes a visual display for displaying e-mail messages, memory, one or more processors coupled to these components and operative to perform the acts of the method. Also, a computer program product may include computer instructions stored on a computer storage medium (memory, a floppy disk or CD-ROM) which are executable by one or more processors for performing the described method.

As described, the mobile station is adapted to receive and send e-mail messages through the wireless network. The e-mail messages are typically received by the mobile station from different sources at different points in time over some period of time. The e-mails messages are initially received at a host server account associated with the user of the mobile station; this e-mail account is synchronized (at least substantially) in real time with the application at the mobile station. Copies of the e-mail messages are sent through the wireless network, received by the mobile station via its e-mail application, and stored in memory.

Each one of these e-mail messages includes an e-mail message header and an e-mail message body (see FIG. 6). As with a traditional e-mail or message application, a list of e-mail message headers corresponding to the e-mail messages may be visually displayed from the mobile station for a quick review by the user (e.g. see FIG. 4). When the user selects one of the displayed e-mail message headers, the mobile station causes the e-mail message body corresponding to the e-mail message header to be visually displayed from the mobile station (e.g. see FIG. 5). Any received e-mail message may be retained in memory or deleted by the user through the user interface.

Beginning at a start block 702 of FIG. 7, the processor of the mobile station monitors a size of the stored e-mail messages in the memory (step 704 of FIG. 7). The mobile station may, for example, monitor a number of e-mail messages stored in the memory, a total memory size of all of the stored e-mail messages, or a ratio/percentage of the total memory size to all of the e-mail messages to a size of available memory. This monitoring may be performed repeatedly and continually over time, on a regular or periodic basis, or invoked in response to a predetermined event (e.g. receipt of a new e-mail message, detection of activity at the user interface, etc.). In doing this, the processor identifies whether the size of the stored e-mail messages has reached a predetermined limit of the memory (step 706 of FIG. 7). The predetermined limit of the memory may be at or near the end of the memory, or at or near the end of a reserved portion thereof. This step may be performed by comparing the size of the e-mail messages with a predetermined memory size value. For example, the total memory size of the e-mail messages may be compared with the total available memory value for e-mail. As another example, the number of e-mail messages may be compared with a predetermined number of allowable e-mail messages.

If the predetermined limit has not been reached as identified at step 706, then the flowchart proceeds to step 708. If the predetermined limit of the memory has been reached, however, then the processor "automatically" deletes e-mail message bodies of some of the e-mail messages from the memory (step 708 of FIG. 7). However, the e-mail message headers associated with these deleted e-mail message bodies are not deleted and remain stored in the memory. The deletion of e-mail message bodies in this fashion is performed by the mobile station (i.e. its processor) without user intervention. Note that the mobile station does not cause the deletion of e-mail message bodies at the server or computer which stores the original e-mail messages; these e-mail messages remain intact and stored in full.

Preferably, only a predetermined number, size, or percentage of the "oldest" e-mail message bodies are deleted from the mobile station's memory. The predetermined number, size, or percentage may be any suitable number, size, or percentage, and may be a fixed value or a variable value which depends on other factors. Also preferably, when e-mail message bodies are deleted, each e-mail message body is deleted in its entirety. Alternatively, only a portion of each e-mail message body (e.g. a majority of the e-mail message body, or almost the entire e-mail message body) is deleted.

Figure 8:
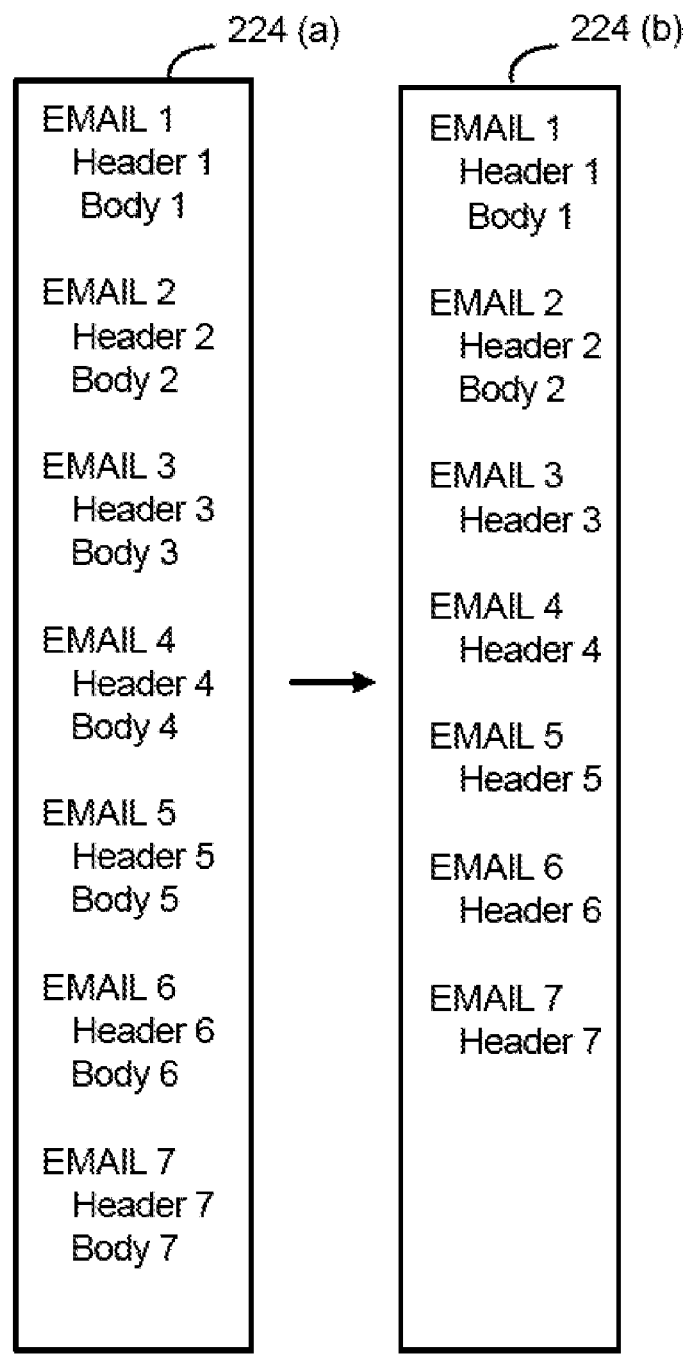
FIG. 8 is an illustrative depiction of the mobile station's memory which stores e-mail messages according to the present application.

The deletion of e-mail message bodies of step 708 is further illustrated in FIG. 8. In FIG. 8, memory 224(*a*) is shown to have seven (7) stored e-mail messages, for which the predetermined limit has been reached. In response, the e-mail message bodies of the five (5) oldest e-mail messages are deleted from memory 224(*b*); two (2) of the newest e-mail messages remain stored in memory 224(*b*) in full. Of course any suitable number of e-mail messages may be stored in and/or deleted from the memory. E-mail message headers associated with e-mail messages having deleted e-mail message bodies may be grouped together in the memory after deletion of the e-mail message bodies. Thus, memory space previously occupied by deleted e-mail message bodies is made available for use. Again, the mobile station does not cause the deletion of e-mail message bodies at the server or computer which stores the original e-mail messages; these e-mail messages remain intact and stored in full.

When the e-mail application of the mobile station is invoked to visually display the list of e-mail message headers of stored e-mail messages (e.g. see FIG. 4), the e-mail message headers corresponding to e-mail messages having deleted e-mail message bodies are still visually displayed as is conventional. Thus, it appears to the user that nothing different has occurred to the stored e-mail messages. It does not appear that any e-mail messages have been deleted when viewing the e-mail list. Thus, the techniques of the present application are substantially transparent to the user. The mobile station is further adapted to visually display e-mail messages even for those having deleted e-mail message bodies.

Referring back to FIG. 7, the processor monitors a user selection of an e-mail message at the user interface (step 710 of FIG. 7). The user may select an e-mail message by highlighting and selecting an e-mail message header from the message list with use of an input device, such as a scrollwheel (e.g. see FIG. 4). If no e-mail message has been selected, the flowchart repeats again starting at step 704 of FIG. 7. If the processor identifies that an e-mail message has been selected by the user at step 710, then the processor identifies whether the e-mail message body of the selected e-mail message is stored in the mobile station's memory (step 712).

Note that the processor may identify whether or not the e-mail message body is stored in the mobile station memory in any suitable fashion. Preferably, each e-mail message includes e-mail message "metadata" which includes an indication of whether or not the e-mail message body has been deleted from the memory. This indication may be, for example, data such as a bit flag which indicates that the e-mail message body has been deleted from the memory (e.g. bit flag='0') or the e-mail message body remains stored in the memory (e.g. bit flag='1'). The processor reads the indication or bit flag to make its decision. The e-mail message metadata also may include an e-mail message identifier for uniquely identifying the e-mail message at the server. For example, each identifier may be or include a number which identifies the e-mail message, where the e-mail messages are stored in numerical order and/or chronological order at the server. The mobile station retains storage of this e-mail message metadata even for those e-mail messages which have e-mail message bodies that were deleted from the memory.

If the e-mail message body of the selected e-mail message is stored in the memory (i.e. it has not been deleted from the memory), then the e-mail message body is retrieved from the mobile station's memory (step 716 of FIG. 7) and displayed in the visual display (step 718 of FIG. 7). See, for example, FIG. 5. If the e-mail message body of the selected e-mail message is not stored in the memory (i.e. it has been deleted from memory per previous step 708) as identified in step 712 of FIG. 7, then a request for the e-mail message body is made to the host computer or server through the wireless network (step 714 of FIG. 7).

The mobile station may request the e-mail message body in any suitable fashion at step 714. Preferably, the processor reads the e-mail message identifier which uniquely identifies the e-mail message and submits this information in its request to the server. Again, each identifier may be or include a number which identifies the e-mail message, where the e-mail messages are stored in numerical order and/or chronological order at the server. The server uses the e-mail message identifier or number to identify and select the appropriate e-mail message to serve the request.

In response to the request from the mobile station at step 714, the host computer or server sends the e-mail message body (or the entire e-mail message) to the mobile station. The mobile station stores the retrieved e-mail message in its memory. The received message information may be stored temporarily or permanently again in relation to all of the other stored e-mail messages in the mobile station memory. The received e-mail message body is then retrieved from the mobile station's memory (step 716 of FIG. 7) and displayed in the visual display (step 718 of FIG. 7). See, for example, FIG. 5. Again, it appears to the user that nothing different has occurred to the stored e-mail messages. It does not appear that any e-mail messages were deleted when viewing the e-mail list. Thus, the techniques of the present application are substantially transparent to the user.

In a variation to steps 710 and 712, an "empty" e-mail message body is visually displayed in response to the user selection of the e-mail message at step 710. The e-mail message is displayed as "empty", except for a visual indication (e.g. a visual text indication such as "MORE" or "RETRIEVE" or "GET MESSAGE") provided for retrieving the e-mail message body. If a user selection of this indication is identified through the user interface (e.g. through use of the scrollwheel), the e-mail message body of the e-mail message is requested and received from the server through the wireless network. The e-mail message body of the e-mail message is visually displayed after receiving the e-mail message body from the server.

An additional technique for use in managing e-mail storage involves the further deletion of all e-mail information associated with the e-mail message when memory availability becomes extremely low. In particular, the e-mail headers associated with the deleted e-mail message bodies (as well as the associated metadata) may be deleted. The e-mail headers and metadata are deleted from the memory when another predetermined limit of memory has been reached, one which is more critical or severe than the first. Thus, when a first predetermined limit of memory is reached then the e-mail message bodies are deleted but the e-mail message headers are retained; thereafter when a second predetermined limit of memory is reached then the e-mail message headers associated with the deleted e-mail message bodies (and the associated metadata) are then deleted.

Some e-mail messages may be deemed to be more important to the user than other e-mail messages. Because of this, the mobile station further provides the user with the ability to mark such important e-mail messages so that they do not get automatically deleted from the mobile station's memory when other surrounding e-mail messages may. Specifically, each e-mail message is associated with a visually displayed user option ("SAVE" or "RETAIN") to always retain the e-mail message in memory of the mobile station. The indication for this user option is stored as metadata in association with the corresponding e-mail message. When the method of FIG. 7 is performed, the mobile station does not delete e-mail message bodies for those e-mail messages having this user option marked as such, but deletes e-mail message bodies for those which are not marked as such.

An even further technique for use in managing e-mail storage involves refraining from deleting e-mail message bodies in step 708 for those e-mail messages having e-mail message bodies that were previously retrieved from the server in step 714. When an e-mail message body is retrieved in step 714, an indication associated with the e-mail message (i.e. metadata) is set to inhibit automatic message body deletion (e.g. bit flag='1') for the particular message. On the other hand, by default the indications for all e-mail messages are set to permit automatic message body deletion (e.g. bit flag='0'). When the deletion of e-mail message bodies in step 708 is performed, the mobile station refrains from deleting e-mail message bodies for those e-mail messages having this indication; however the mobile station deletes e-mail message bodies for those which are not marked as such. With this technique, the mobile station infers that the e-mail message should be retained based on the previous retrieval of the e-mail message body (step 714).

Thus, methods and apparatus for efficiently managing the storage of e-mail message information for a mobile station have been described. A plurality of e-mail messages are received by the mobile station through a wireless network and stored in memory. If a size of the e-mail messages reaches a predetermined limit of the memory, e-mail message bodies of some of the e-mail messages are deleted from the memory while e-mail message headers of these e-mail messages are retained. E-mail message headers of e-mail messages having deleted e-mail message bodies may still be visually displayed at the mobile station. If a user selection of one of these e-mail messages is detected, an e-mail message body of the e-mail message is requested by the mobile station and received from a server through the wireless network. Thus, the e-mail message body of the selected e-mail message may still be visually displayed at the mobile station.

A computer program product of the present application includes a storage medium; computer instructions stored in the storage medium; where the computer instructions are executable by one or more processors of a mobile station for performing the method. A mobile station of the present application includes a wireless transceiver; a user interface which includes a visual display for displaying e-mail messages; memory; and one or more processors coupled to the wireless transceiver, the user interface, and the memory. The one or more processors are operative to receive a plurality of e-mail messages through the wireless transceiver and store the e-mail messages in the memory; identifying that a size of the e-mail messages has reached a predetermined limit of the memory; and delete, from the memory, at least portions of e-mail message bodies of some of the e-mail messages while retaining storage of e-mail message headers thereof based on identifying that the size of the e-mail messages has reached the predetermined limit.

In one embodiment, an e-mail message header of an e-mail message having a deleted e-mail message body is visually displayed in a list; a user selection of the e-mail message through a user interface is identified; an e-mail message body of the e-mail message is requested and received from a server through the wireless network based on identifying the user selection of the e-mail message; and the e-mail message body of the e-mail message is visually displayed after receiving the e-mail message body from the server. In an alternative embodiment, an e-mail message header of an e-mail message having a deleted e-mail message body is visually displayed in a list; a user selection of the e-mail message through a user interface is identified; an indication for retrieving the e-mail message body is visually displayed in response to identifying the user selection of the e-mail message; a user selection of the indication for retrieving the e-mail message body is identified; the e-mail message body of the e-mail message is requested and received from a server through the wireless network in response to identifying the user selection of the indication; and the e-mail message body of the e-mail message is visually displayed after receiving the e-mail message body from the server.

The above-described embodiments of the present application are intended to be examples only. Those of skill in the art may effect alterations, modification, and variations to the particular embodiments without departing from the scope of the application. The invention described herein in the recited claims intends to cover and embrace all suitable changes in technology.

What is claimed is:

1. A method for use in managing the storage of message information in a mobile communication device operative in a wireless communication network, the method comprising:

receiving, at the mobile device via the wireless network, a plurality of messages and storing message information of the messages in memory, each message including at least one correspondent address and conversation text with the at least one correspondent address, each message further including metadata comprising an identifier for uniquely identifying the message at a server;

identifying whether a size of the message information has reached a first predetermined limit of the memory;

deleting, from the memory, automatically without user intervention, at least portions of the conversation text of some of the messages while retaining storage of the correspondent addresses and the metadata thereof based on identifying that the size of the message information has reached the first predetermined limit;

identifying whether the size of the message information has reached a second predetermined limit of the memory which is greater than the first predetermined limit; and deleting, from the memory, automatically without user intervention, the correspondent addresses and the metadata associated with the messages having the deleted conversation texts based on identifying that the size of the message information has reached the second predetermined limit.

2. The method of claim 1, wherein the messages comprise electronic mail (e-mail) messages.

3. The method of claim 1, wherein the act of deleting at least portions of the conversation text of some of the messages comprises the further act of deleting the conversation text in its entirety.

4. The method of claim 1, further comprising:
maintaining storage of the messages with the conversation text at the server.

5. The method of claim 1, further comprising:
causing a correspondent address of a message having deleted conversation text to be visually displayed in a list;
identifying a user selection of the message through a user interface;
requesting and receiving, via the wireless network, conversation text of the message from the server based on identifying the user selection of the message; and
causing the conversation text of the message to be visually displayed after receiving the conversation text from the server.

6. The method of claim 1, further comprising:
causing a correspondent address of a message having deleted conversation text to be visually displayed in a list;
identifying a user selection of the message through a user interface;
causing an indication for retrieving the conversation text to be visually displayed in response to identifying the user selection of the message;
identifying a user selection of the indication for retrieving the conversation text;
requesting and receiving, via the wireless network, the conversation text of the message from the server in response to identifying the user selection of the indication; and
causing the conversation text of the message to be visually displayed after receiving the conversation text from the server.

7. The method of claim 1, further comprising:
causing a correspondent address of a message having deleted conversation text to be visually displayed in a list;
identifying a user selection of the message through a user interface;
requesting and receiving, via the wireless network, conversation text of the message from the server based on identifying the user selection of the message;
causing the conversation text of the message to be visually displayed after receiving the conversation text from the server;
setting an indication for refraining from further deletion of the conversation text for the message having the conversation text received from the server;
identifying again whether a size of the message has reached the first predetermined limit of the memory; and
refraining from deleting any portion of the conversation text for the message having the indication after identifying again that the size of the messages has reached the first predetermined limit of the memory.

8. A computer program product, comprising:
a non-transitory computer readable medium;
computer instructions stored in the non-transitory computer readable medium;
the computer instructions being executable by one or more processors of a mobile communication device for:
receiving, via a wireless network, a plurality of messages and storing message information of the messages in memory of the mobile device, each message including at least one correspondent address and conversation text with the at least one correspondent address, each message further including metadata comprising an identifier for uniquely identifying the message at a server;
identifying whether a size of the message information has reached a first predetermined limit of the memory;
deleting, from the memory, automatically without user intervention, at least portions of the conversation text of some of the messages while retaining storage of the correspondent addresses and the metadata thereof based on identifying that the size of the message information has reached the first predetermined limit;
identifying whether the size of the messages has reached a second predetermined limit of the memory which is greater than the first predetermined limit; and
deleting, from the memory, automatically without user intervention, the correspondent addresses and the metadata of the messages having the deleted conversation text based on identifying that the size of the message information has reached the second predetermined limit.

9. The computer program product of claim 8, wherein the messages comprise electronic mail (e-mail) messages.

10. The computer program product of claim 8, wherein deleting at least portions of the conversation text comprises deleting the conversation text in its entirety.

11. The computer program product of claim 8, wherein the computer instructions are further executable for:
maintaining storage of the messages with the conversation text at the server.

12. The computer program product of claim 8, wherein the computer instructions are further executable for:
causing a correspondent address of a message having deleted conversation text to be visually displayed in a list;
identifying a user selection of the message through a user interface;
requesting and receiving, via the wireless network, conversation text of the message from the server based on identifying the user selection of the message; and
causing the conversation text of the message to be visually displayed after receiving the conversation text from the server.

13. The computer program product of claim 8, wherein the computer instructions are further executable for:
causing a correspondent address of a message having deleted conversation text to be visually displayed in a list;
identifying a user selection of the message through a user interface;
causing an indication for retrieving the conversation text to be visually displayed in response to identifying the user selection of the message;
identifying a user selection of the indication for retrieving the conversation text;

requesting and receiving, via the wireless network, the conversation text of the message from the server in response to identifying the user selection of the indication; and causing the conversation text of the message to be visually displayed after receiving the conversation text from the server.

14. A mobile communication device operative in a wireless communication network, the mobile communication device comprising:

one or more processors;

memory coupled to the one or more processors;

a wireless transceiver coupled to the one or more processors and operative for communications with the wireless communication network;

a user interface coupled to the one or more processors;

the user interface including a visual display for displaying message information;

the one or more processors being configured to:
receive, via the wireless transceiver, a plurality of messages and store message information of the messages in the memory, each message including at least one correspondent address and conversation text with the at least one correspondent address, each message further including metadata comprising an identifier for uniquely identifying the message at a server;

identify whether a size of the message information has reached a first predetermined limit of the memory;

delete, from the memory, automatically without user intervention, at least portions of conversation text of some of the messages while retaining storage of the correspondent addresses and the metadata thereof based on identifying that the size of the message information has reached the first predetermined limit;

identify whether the size of the message information has reached a second predetermined limit of the memory which is greater than the first predetermined limit; and delete, from the memory, automatically without user intervention, the correspondent addresses and the metadata associated with the messages having the deleted conversation text based on identifying that the size of the message information has reached the second predetermined limit.

15. The mobile device of claim 14, wherein the messages comprise electronic mail (e-mail) messages.

16. The mobile device of claim 14, wherein deleting at least portions of the conversation text comprises deleting the conversation text in its entirety.

17. The mobile device of claim 14, wherein the one or more processors are further configured to:

cause a correspondent address of a message having deleted conversation text to be visually displayed in a list;

identify a user selection of the message through a user interface;

request and receive, via the wireless transceiver, conversation text of the message from the server based on identifying the user selection of the message; and cause the conversation text of the message to be visually displayed after receiving the conversation text from the server.

18. The mobile device of claim 14, wherein the one or more processors are further configured to:

cause a correspondent address of a message having deleted conversation text to be visually displayed in a list;

identify a user selection of the message through a user interface;

cause an indication for retrieving the conversation text to be visually displayed in response to identifying the user selection of the message;

identify a user selection of the indication for retrieving the conversation text;

request and receive, via the wireless transceiver, the conversation text of the message from the server in response to identifying the user selection of the indication; and cause the conversation text of the message to be visually displayed after receiving the conversation text from the server.

19. The mobile device of claim 14, wherein the one or more processors are further configured to:

cause a correspondent address of a message having deleted conversation text to be visually displayed in a list;

identify a user selection of the message through a user interface;

request and receive, via the wireless transceiver, conversation text of the message from the server based on identifying the user selection of the message;

cause the conversation text of the message to be visually displayed after receiving the conversation text from the server;

set an indication for refraining from further deletion of the conversation text for the message having the conversation text received from the server;

identify again whether a size of the messages has reached the first predetermined limit of the memory; and refrain from deleting any portion of the conversation text for the message having the indication after identifying again that the size of the messages has reached the first predetermined limit of the memory.

20. The mobile device of claim 14, which comprises a cellular telephony device operative in a cellular telecommunications network.

* * * * *